United States Patent [19]

Strauff

[11] 4,051,766
[45] Oct. 4, 1977

[54] ARRANGEMENT FOR STEERING-POWER LIMITATION IN HYDRAULIC SERVO-STEERING SYSTEMS

[75] Inventor: Günter Strauff, Kaarst, Germany

[73] Assignee: Langen Company, Dusseldorf, Germany

[21] Appl. No.: 542,671

[22] Filed: Jan. 21, 1975

Related U.S. Application Data

[63] Continuation of Ser. No. 316,397, Dec. 18, 1972, abandoned.

[30] Foreign Application Priority Data

Dec. 17, 1972 Germany .......................... 2162631

[51] Int. Cl.$^2$ .................. F15B 15/17; F15B 11/08; F15B 13/04
[52] U.S. Cl. ................................ 91/417 R; 91/371; 91/434; 91/451; 180/132
[58] Field of Search ............ 91/370, 371, 434, 417 R; 180/74.2 R; 60/329

[56] References Cited

U.S. PATENT DOCUMENTS

| 2,298,457 | 10/1942 | Berges | 91/434 |
|---|---|---|---|
| 2,572,385 | 10/1951 | Price | 60/329 |
| 2,617,257 | 11/1952 | Douglas | 91/434 |
| 2,880,586 | 4/1959 | Lincoln | 91/434 |
| 2,893,504 | 7/1959 | Jockson | 91/371 |
| 2,893,505 | 7/1959 | Schultz | 91/371 |
| 2,998,263 | 8/1961 | Muller et al. | 180/79.2 R |
| 3,099,940 | 8/1963 | Ledue | 91/434 |
| 3,101,808 | 8/1963 | Gordon | 180/79.2 R |

FOREIGN PATENT DOCUMENTS

| 796,194 | 6/1958 | United Kingdom | 180/79.2 R |
|---|---|---|---|
| 783,467 | 9/1957 | United Kingdom | 180/79.2 R |

*Primary Examiner*—Paul E. Maslousky

[57] ABSTRACT

An arrangement for limiting the steering-power in hydraulic servo-steering systems provided with a valve of the type of a three-way three positions valve for controlling a pressure flow from a pressure source to a working space of a preferably higher effective area of a servo-motor or from the working space to a return flow, in which the working space of a preferably lesser effective area is always connected with the pressure source, and the reaction areas with hydraulic reaction areas serve for signalling back a steering sensation to the steering wheel, which reaction areas are arranged to the various effective areas of the servo-motor, and, in combination with respective lever arms, etc., and/or respective reaction areas define a torque dynamometer, etc.

5 Claims, 5 Drawing Figures

ARRANGEMENT FOR STEERING-POWER LIMITATION IN HYDRAULIC SERVO-STEERING SYSTEMS

This is a continuation of application Ser. No. 316,397 filed Dec. 18, 1972 now abandoned.

BACKGROUND OF THE INVENTION

The present invention relates to vehicles provided with a steering wheel and steerable wheels and more particularly to an arrangement for limiting the steering power in hydraulic servo-steering systems having a control valve.

PRIOR ART

It is known that the servo-steering systems of prior art were equipped with steering valves (or control valves) having four control edges. These control valves served the purpose of supplying the working space of a servo motor, which, in general, had areas of equal sizes. One working space was always connected with the reversal, (or back flow), when the other was in communication with the pressure source. Reaction members were provided with areas mostly of equal sizes and functioning on the same lever arms, in so far as the reaction areas were not anyway identical with the front areas of one or a plurality of control pistons. In an arrangement of this type, the cut-off tuning of the torque dynamometer, etc., is simply made by the respective, alternating pressures in the reaction chambers. Accordingly, it was easy to realize steering power definitions (or limitations). It sufficed to limit the pressure in the reaction chambers to the desired degree. This limitation was, for example, accomplished by means of pressure reducing valves (German Pat. No. 1,050,672) which were switched between the working space and reaction chamber.

It was proved that such arrangements are unsuitable for servo-steering systems having a control valve of the three way three positions type. The reason for this is the fact that the reaction chamber which is arranged for the working space having the smaller effective area, as well as the working space itself is always stressed from the substantially constant presure of the pressure source. The off tuning of the torque dynamometer is made only by means of the alternating pressure in the other reaction chamber.

OBJECTS AND SUMMARY OF THE INVENTION

It is therefore the object of the present invention to provide for means which limit the off-tuning in one as well as in the other direction.

The solution of this problem is accomplished through the combination of the following characteristics:

The working space of the preferably larger effective areas of the servo motor is connected with the respective reaction chambers by means of a restrictor;

the working space of the preferably smaller effective area of the servo motor or the pressure source is connected with the reaction chamber of the preferably larger effective area, by means of a pressure release valve, which opens when the pressure falls below a certain predetermined level in the reaction chamber or when the pressure exceeds a certain pressure difference between the working space and the reaction chamber; and the reaction chamber of the preferably larger effective area of the servo-motor is connected with the reversal of a pressure limitation valve, which prevents the exceeding of a predetermined upper pressure in the reaction chamber occurring.

Suitably, the pressure reducing valve represents a pressure drop valve which effects a constant pressure difference $\Delta P$. When at the pressure-limitation valve, provided there is a pressureless bypass, the identical pressure difference $\Delta P$ is adjusted and if in addition, the ratio of the effective areas is 2:1, the identical maximum reaction forces can be obtained for both directions. Naturally, in this case it requires that
$2 \cdot \Delta P > P_p$, and on the other hand $\Delta P < P_p$, whereby $\Delta P$ represents the pressure difference and $p_p$ represents the pressure in each working space assigned to the smaller areas.

This invention is explained in greater detail in its structure and functional method in the embodiments illustrated in the drawings, in which:

DETAILED DESCRIPTION OF THE INVENTION

Figure 1:
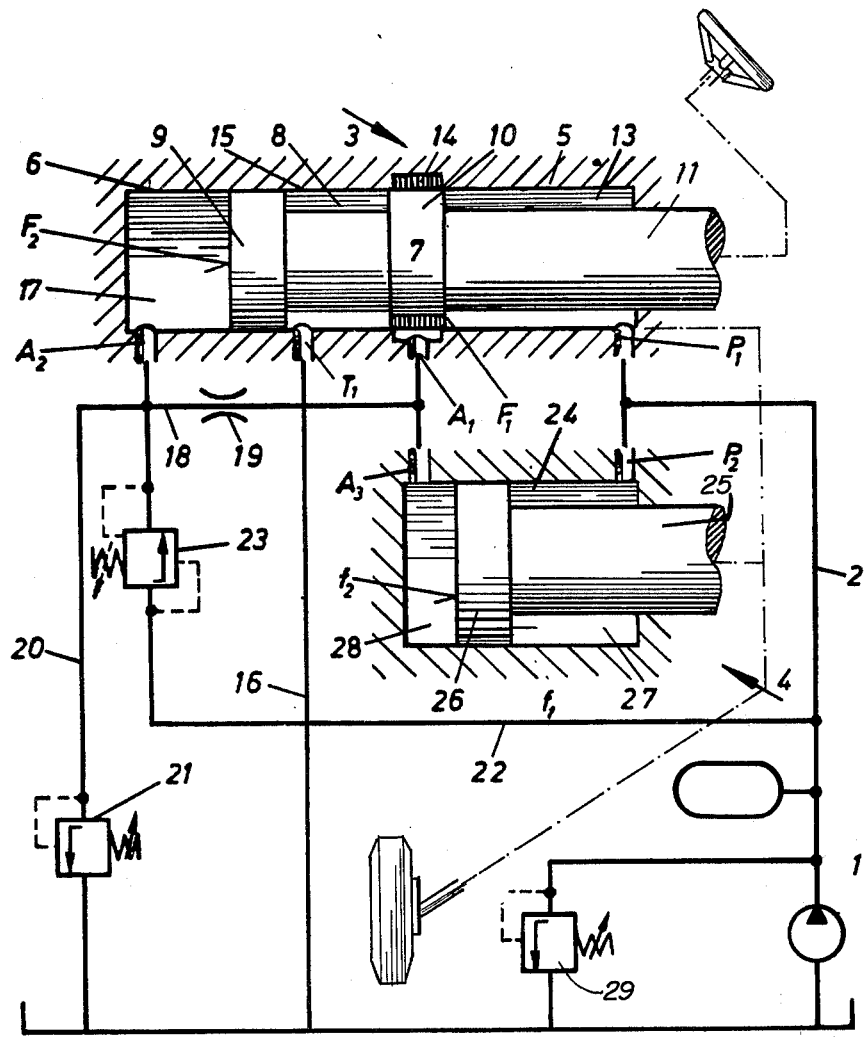
FIG. 1 is a schematic view of an arrangement in which the control piston of the steering (control) valve is in itself provided with reaction areas.

A pump 1 conveys a pressure medium into a pressure pipe or line 2 which leads to a connection member $P_1$ of a control valve 3 as well as to a connection member $P_2$ of the servo-motor 4. The control valve is provided with a housing 5 which, in its interior, is provided with a bore or cylinder 6 for receiving a control piston 7. The control piston 7 is provided with two axially spaced shoulders 9 and 10 separated by a shank 8 of reduced diameter. Attached to the shoulder 10 is an activator rod 11 which is connected with one section of an at least two-part power transmission device (not shown) between the steering wheel and the steerable wheels. The housing 5 of the control valve 3 is connected with the other section of such transmission. The activation is made on the basis of a small relative movement between the two parts. The production of this relative movement has nothing in common with the present invention and is, for this reason, not illustrated in the present invention and is, for this reason, not illustrated in detail.

The connection member $P_1$ leads to an annular space 13 provided between the rod 11 and the wall of the bore 6. The space 13 is delimited at one side by the annular face of the shoulder 10 which functions as a reaction area $F_1$. In a central position of the control piston 7, the shoulders 10 separates an annular slot or groove 14, which surrounds the shoulder 10 from the space 13 as well as from an annular space 15 located between the reduced shank 3 and the wall of the bore 6. A connection member $T_1$ leads into the annular space 15, and the connection member $T_1$ is connected with a drain pipe 16. The free front area of the shoulder 9 functions as a reaction are $F_2$ and delimits a reaction chamber 17, which is provided with a connection means $A_2$.

The control piston thus functions as a force comparator which compares the forces caused by the pressures in the reaction chamber 17 and the annular space 13 in combination with the reaction areas $F_2$ and $F_1$ for the relay of a steering sensation to the steering wheel via the rod 11.

A pipe 18 leads from the connection means $A_2$, into which pipe is inserted a restrictor 19, to a connection member $A_1$ which communicates with annular groove 14. An additional pipe 20 leads from the connection means $A_1$ or from the pipe 18, and the pipe 20 communicates with a supply reservoir. A pressure limitation valve 21 is mounted in the pipe 20. A further pipe 22 branches from the pressure pipe 2 and continues via a pressure release valve 23 to the connection member $A_2$.

The servo-motor 4 consists of a cylinder 24 in which slides a piston 26 having a piston rod 25. The servo motor functions as a support means of the manual steering power on one section of the power transmission device (not shown) or is switched in parallel to the same. The connection means $P_2$ leads to an annular working space 27 provided by the piston rod 25 and the wall of the cylinder 24, with the working space 27 being delimited by a smaller effective area $f_1$ of the piston 26. The larger effective area $f_2$ of the piston 26 delimits a working space 28 with which a connection member $A_3$ connected with the pipe 18 communicates. A pressure limitation valve 29 connected to the pressure pipe 2 serves for limiting the pressure in the entire system. The ratio of the reaction areas as well as the ratio of the effective areas is:

$$F_2 : F_1 = f_2 : f_1 = 2:1.$$

In order to explain the function, it should be assumed that the pressure limitation valve 29 is set to 100 bar. The pressure difference $\Delta P_{ab}$ on the pressure reducing valve 23, as well as the pressure difference $\Delta p_{ab}$ on the pressure limitation valve 21 would be 70 bar. The respective pressures in the chamber 17, and the system communicating therewith would be indicated $p_A$, while the pressure in the annular space 13 and the system communicating therewith would be $p_p$. In the illustrated respective position of a straight-ahead drive, a pressure of 50 bar developes in the working space 28 as well as in the chamber 17. If the servo-motor 4 is in balance and no resulting forces are affecting the control piston 7, then $$50 \cdot f_2 = 100 \, ] \, f_1, \text{ as well as}$$
$$50 \cdot F_2 = 100 \cdot F_1.$$

If the control piston 7 is moved to the left in connection with a steering function, then pressure medium flows from connection member $P_1$ to connection member $A_1$ and from there at first via the connection member $A_3$ into the working space 28, in which takes place a pressure accumulation in accordance with the forces which have to be counteracted. This pressure accumulation moves, by means of pipe 18 and the restrictor 19, to the connection member $A_2$ and thence into the chamber 17. If one assumes that the pressure in the chamber 17 amounts not to 60 bar, and the manual power which is equal with the resultant reaction power on the control piston 7, and indicated by $R_H$, then there results the following equation:

$$R_H = 60 \cdot F_2 - 100 \cdot F_1$$
$$= 120 \cdot F_1 - 100 \, F_1$$
$$= 20 \, F_1.$$

IF $F_1$ indicates an area unit, the manual power amounts then only to 20 power units. If the pressure in the chamber 17 has increased to 70 bars, one receives $$K_{Hmax} = 70 \, F_2 - 100 \, F_1$$
$$= 40 \, F_1.$$

Figure 3:
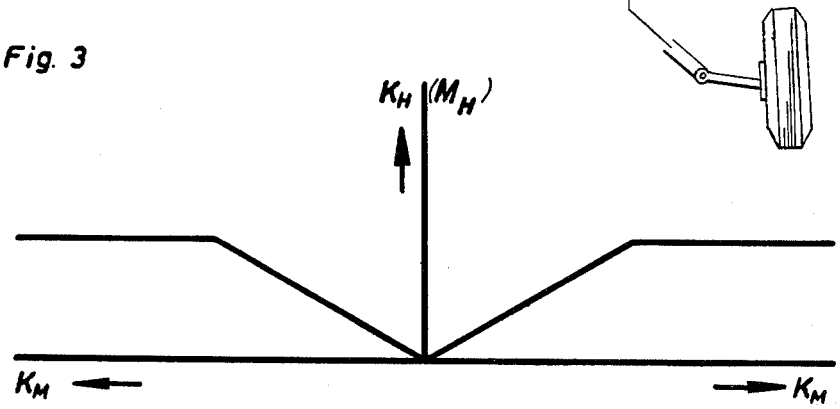
FIG. 3 is a view illustrating the connection between the power on the servo-motor and reaction power.

If the pressure tries to increase further, the pressure limitation valve 21 opens and retains the pressure constant at 70 bar. The pressure in the space 28 can naturally increase further and, in an extreme situation, may reach 100 bar. This situation may be seen in FIG. 3. It will be noted that the manual power may be seen in FIG. 3. It will be noted that the manual power at first increases proportionally to the power $K_M$ on the servomotor 4 and continues from there horizontally. In order to prevent an excessive outflow of pressure medium from the space 28 by means of the pressure limitation valve 21, the restrictor 19 is provided for pipe 18. This restrictor 19 permits a very rapid pressure equalization below the pressure limit of 70 bar since it is only then possible that extremely small quantities can pass through, as a result of the controlling movements of control piston 7. The crosscut of these quantities can be measured accordingly small so that when pressure variations develop, also only small quantities can escape. If, in a reverse manner, the control piston 7 is moved to the right, it produces the connection $A_1$–$T_1$ so that a pressure drop develops in the space 28 as well as in the chamber 17. When the pressure drop is 10 bar, namely, at $P_A=40$ bar, this results in the following manual power:

$$K_H = 100 \cdot F_1 - 40 \cdot F_2$$
$$= 20 \, F_1.$$

If the pressure drops further to 30 bar, there is obtained:

$$K_{max} = 100 \, F_1 - 30 \cdot F_2$$
$$= 40 \, F_1.$$

Each further drop in pressure results in the opening of the pressure release valve, which is adjusted to a pressure difference of $P_p - P_A = 100 - 30 = \Delta P_{zu} = 70$ bar.

The opening effects a flow from the pipe 22 into pipe 18 in such a way that a dynamic pressure develops at the restrictor 19, whereby the dynamic pressure does not fall below the value of 30 bar. This fact holds true naturally as long as the pump 1 conveys, or the pressure storage has stored pressure.

It is noticed that in both steering directions, the steering power is limited to the equal value. In general the following is obtained for this value:

$$K_{Hmax} = (2 \cdot \Delta P_{zu} - P_p) \cdot F_1, \text{ or}$$

$$K_{Hmax} = (2 \cdot \Delta P_{ab} - P_p) \cdot F_1.$$

In view of the above considerations.

$$\Delta P_{zu} = \Delta P_{ab}$$

the identical value is indeed obtained in both directions.

Figure 2:
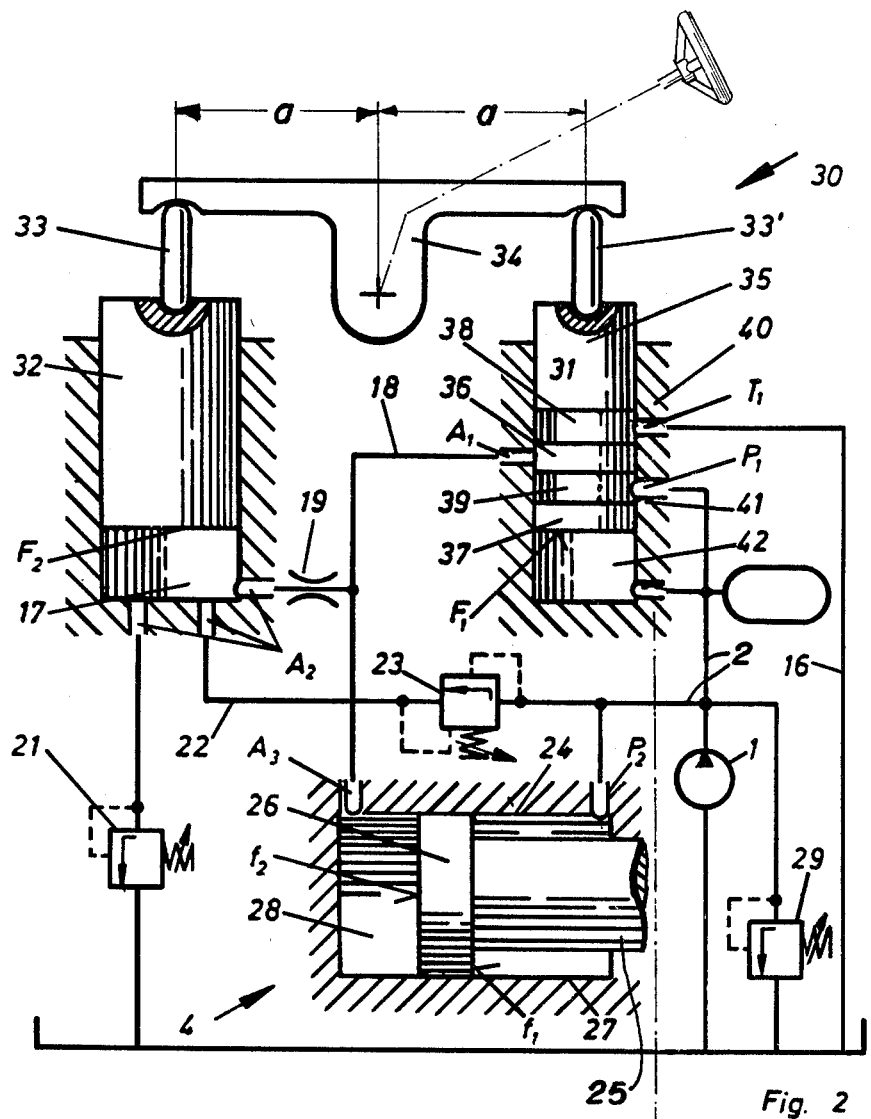
FIG. 2 is a schematic view of an arrangement for a control valve provided with one control piston having only one reaction area, as well as with a separate reaction piston with an opposite effect.

FIG. 2 differs from FIG. 1 in that control valve 30 is provided with a control piston 31 having only one reaction area $F_1$. The reaction area $F_2$ is arranged on a separately arranged reaction piston 32, which, like the control piston 31, is activated by means of a rotatable lever 34 via thrust rods 33 and 33', in such a manner that the reaction piston 32 is in counteracting relationship with the control piston 31. The control piston 31 is provided with three axially spaced shoulders 35, 36, and 37 which are separated by shanks 38, and 39 of reduced diameters. The connection member $T_1$ empties into an annular space 40 surrounding the shank 38, while the connection member Phd 1 empties into an annular space 41 surrounding the shank 39. The central shoulder 36 closes the connection member $A_1$ in a center position of the control piston 31. The thrust rod 33' affects the shoulder 35, while the free front area of the shoulder 37 functions as the reaction area F and delimits a reaction space 42. The control piston 31 and the reaction piston 32 thus function in combination with the rotatable lever 34 as a torque comparator which compares the torques acting on the lever 34 and caused by the pressures in the reaction chamber 17 and the reaction space 42 affecting the reaction areas $F_2$ and $F_1$ for the relay of a steering sensation to the steering wheel. Into the space 42 leads a connection member $P_1'$, connected with the pressure pipe 2. The additional sections of the arrangement are referenced with the same numerals as in FIg. 1, insofar as they fulfill the same functions. Since the mode of operation is substantially the same, reference is made to the description of FIG. 1.

In order to explain the function of the embodiment of FIG. 2, it should be assumed that the pressure limitation valve 28 is set to 100 bar. The pressure difference $\Delta P_{ab}$ on the valve 23, as well as the pressure difference $\Delta P_{ab}$ on the pressure limitation valve 21 would be 70 bar. The respective pressures in the chamber 17, and the system communicating therewith would be indicated $P_A$, while the pressure in the reaction space 42 and the system communicating therewith would be $P_p$. In the illustrated respective position of a straight-ahead drive, a pressure of 50 bar develops in the working space 28 as well as in the chamber 17. If the servo-motor 4 is in balance and no resulting forces are affecting the control piston 31, then $$50 \cdot f_2 = 100 \cdot f_1, \text{ as well as}$$
$$50 \cdot F_2 = 100 \cdot F_1.$$

If the control piston 31 is moved by a clockwise turn of the lever 34 in connection with a steering function, then pressure medium flows from connection member $P_1$ to connection member $A_1$ and from there at first via the connection member $A_3$ into the working space 28, in which takes place a pressure accumulation in accordance with the forces which have to be counteracted. This pressure accumulation moves by means of pipe 18 and the restrictor 19, to the connection member $A_2$, and thence into the chamber 17. If one assumes that the pressure in the chamber 17 amounts now to 60 bar, and the manual torque which is equal with the resultant reaction torque on the lever 34, and indicated by $M_H$, then there results the following equation, in which a indicates the length of the arms of the lever 34:

$$M_H = 60 \cdot F_2 \cdot a - 100 \cdot F_1 \cdot a$$
$$= 120 \cdot F_1 \cdot a - 100 \cdot F_1 \cdot a$$
$$= 20 F_1 \cdot a$$

If $F_1$ indicates an area unit, the manual torque amounts then only to 20 torque units. If the pressure in the chamber 17 has increased to 70 bars, one receives $$M_{max} = 70 F_2 \cdot a - 100 F_1 \cdot a$$

If the pressure tries to increase further, the pressure limitation valve 21 opens and retains the pressure constant at 70 bar. The pressure in the space 28 can naturally increase further and, in an extreme situation, may reach 100 bar. This situation may be seen in FIG. 3. It will be noted that the manual torque at first increases proportionally to the power $K_M$ on the servo-motor 4 and continues from there horizontally. In order to prevent an excessive outflow of pressure medium from the space 28 by means of the pressure limitation valve 21, the restrictor 19 is provided for pipe 18. This restrictor 19 permits a very rapid pressure equalization below the pressure limit of 70 bar since it is only then possible that extremely small quantities can pass through, as a result of the movements of reaction piston 32. The crosscut of these quantities can be measured accordingly small so that when pressure variations develop, also only small quantities can escape. If, in a reverse manner, the control piston 31 is moved by a counterclockwise rotation of the lever 34, it produces the connection $A_1$-$T_1$ so that a pressure drop develops in the space 28 as well as in the chamber 17. When the pressure drop is 10 bar, namely, at $P_A = 40$ bar, this results in the following manual torque:

$$M_H = 100 \cdot F_1 \cdot a - 40 \cdot F_2 \cdot a$$
$$= 20 F_1 \cdot a$$

If the pressure drops further to 30 bar, there is obtained:

$$M_{Hmax} = 100 F_1 \cdot a - 30 \cdot F_2 \cdot a$$
$$= 40 F_1 \cdot a$$

Each further frop in pressure results in the opening of the pressure release valve, which is adjusted to a pressure difference of $P_p - P_A = -30 = \Delta P_{zu} = 70$ bar.

The opening effects a flow from the pipe 22 via the chamber 17 into pipe 18 in such a way that a dynamic pressure develops at the restrictor 19, whereby the dynamic pressure does not fall below the value of 30 bar. This fact holds true naturally as long as the pump 1 conveys, or the pressure storage has stored pressure.

It is noticed that in both steering directions, the steering torque is limited to the equal value. In general the following is obtained for this value:

$$M_{Hmax} = (2 \cdot \Delta P_{zu} - P_p) \cdot F_1 \cdot a \text{ or } M_{Hmax} = (2 \cdot \Delta P_p) \cdot F_1 \cdot a$$

In view of the above considerations, $$\Delta P_{zu} - \Delta P_{ab}$$

the identical value is indeed obtained in both directions.

Figure 4:
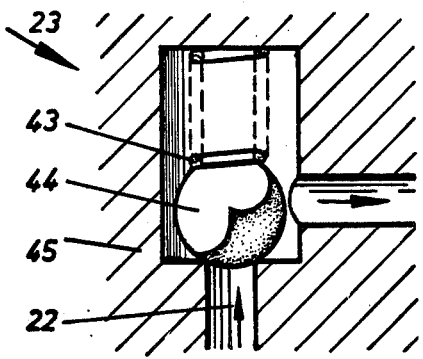
FIG. 4 is a detailed view of a pressure drop valve.

Possibly the simplest form of a pressure release valve 23 is illustrated in FIG. 4. The valve includes a ball 44 biased by a spring 43, with the ball resting on a valve seat 45. The ball 44 is stressed by the pressure of the inflowing pressure medium in the direction of the opening, while in the closing direction, the pressure of the outflowing pressure medium supports the force of the spring 43. The pressure difference depends on the initial stress of the spring 43. If no pressure exists at the outlet, such a valve may then also be utilized as a pressure limitation valve 21. It is obvious, that valves of identical functions with control pistons are suitable. The valves may thereby, of course, be adjusted by changing the initial stress of the spring.

Figure 5:
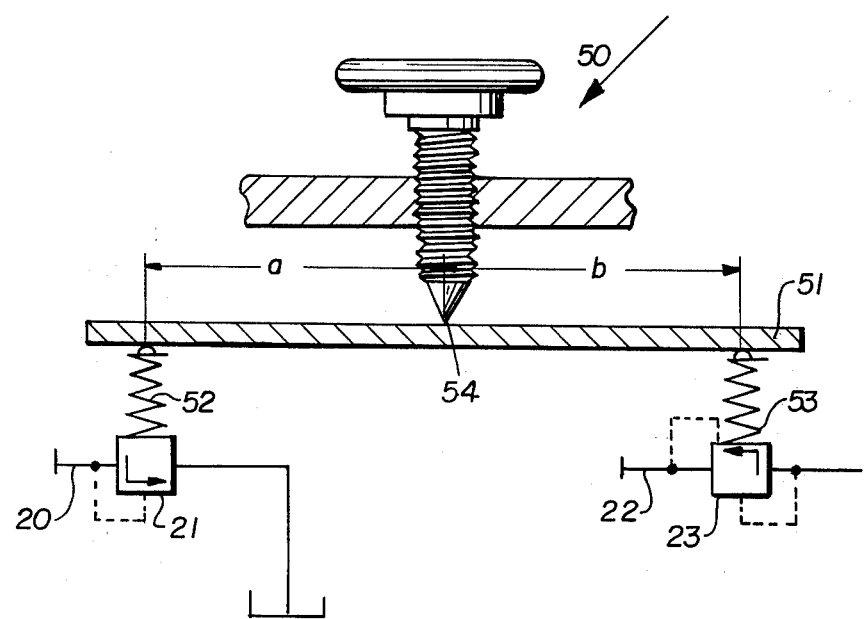
FIG. 5 is a diagrammatic view illustrating the mutual adjusting of the pressure limitation valve and the pressure reducing valve.

FIG. 5 illustrates diagrammatically the mutual adjusting of the pressure limitation valve 21 and the pressure release valve 23. An adjustment mechanism 50 affects a lever arm 51 on which are supported spring element 52 of the valve 21 and spring element 53 of the valve 23 at opposite sides of pivot 54. If the spring constants of the spring element 52 are referenced $C_1$ and the spring constant of the spring element 53 referenced $C_2$, then the lever arms $a$ and $b$ between the power communication points of the elements 52 and 53 and the power communication point 54 will react in an opposite manner than the inherent spring constants, namely:

$(a/b) = (C_2/C_1)$.

A pressure-reducing valve or a pressure-ratio valve may be inserted in place of a pressure release valve. The mounting of such valves, however, is only recommended release valve. The mounting of such valves, however, is only recommended when the pressure $p_p$ can be accepted as constant. With regard to the embodiments, the present invention may also be utilized for servo-steering systems with control valves which have no reaction areas, but which are provided with one or two special reaction members. Furthermore, the spatial arrangement of the control valve and servo motor is of no importance insofar as the necessary pipe connections are available for the installing of valves. Under these considerations, even integrated embodiments may be realized. The activation of the control valve on the basis of a relative movement of two parts being arranged to move towards each other, can be obtained in many different ways. It is, however, of a subordinate importance within the frame of the instant invention. Finally, it should be understood that the illustrated pipe connections, and partially also the connections, may be of different arrangement or connected in a different manner, as long as the individual systems in themselves remain in communication.

In contrast to the illustrated embodiments, it is furthermore possible to utilize also servo-motors with identical effective areas. It is then, however, necessary to install a pressure convertor in the working space between the pressure source and the work space which is not controlled by the control valve, whereby the pressure converter reduces the pressure.

In the claims, the term "piston means" has reference to the — control piston 7 — in FIG. 1 and the — control piston 31 and reaction piston 32 — in FIG. 2.

What I claim is:

1. An arrangement for limiting the steering power in hydraulic servo-steering systems for vehicles having steerable wheels and
   a steering wheel,
   a servo-motor (4) having
   a cylinder (24),
   a piston (26) and
   a piston rod (25) defining larger (28) and smaller (27) working areas, the smaller working area (27) being continuously connected with a pressure source (1),
   the servo-motor (4) being operatively connected with the steerable wheels,
   a comparator means (3, 3o) being operatively connected with the steering wheel and provided for the relay of a steering sensation to the steering wheel,
   the comparator means (3, 3o) including an activator means (33, 34; 11),
   a first reaction chamber (17) of a larger effective reaction area ($F_2$) and
   a second reaction chamber (42) of a smaller effective reaction area ($F_1$) continuously connected with the pressure source (1) and
   a three way, three position control valve portion (7, 31) controlling a pressure medium flow from the pressure source (1) to the larger working area (28) of the servomotor (4) or from said larger working area (28) to a return flow ($T_1$, 16),
   said larger working area (28) of the servo-motor (4) being connected by a restrictor (19) with the first reaction chamber (17),
   the smaller working area (27) of the servo-motor (4) 41 and the pressure source (1) being connected with the first reaction chamber (17) by a pressure release valve (23),
   said pressure release valve (23) opening during the reduction of a predetermined lower pressure in the first reaction chamber (17) or during the exceeding of a predetermined pressure difference between the smaller working area (27) and the first reaction chamber (17),
   and the first reaction chamber (17) being connected with 51 and exhaust passage via a pressure limitation valve (21), with said pressure limitation valve (21) preventing the exceeding of a predetermined upper pressure of the first reaction chamber (17).

2. The arrangement for limiting the steering power in hydraulic servo-steering systems for vehicles as claimed in claim 1 in which the pressure release valve comprises a pressure drop valve.

3. The arrangement for limiting the steering power in hydraulic servo-steering systems for vehicles as claimed in claim 2 in which the pressure difference which is predetermined on the pressure drop valve is of identical value as the opening pressure of the pressure limitation valve.

4. The arrangement for limiting the steering power in hydraulic servo-steering systems for vehicles as claimed in claim 1 in which the pressure release valve and the pressure limitation valve are mutually adjustable.

5. The arrangement for limiting the steering power in hydraulic servo-steering systems for vehicles as claimed in claim 4 in which the adjustment is effected by means of a lever having arms and springs whereby the lever arms in said lever and springs are proportionally in reverse to the values of the springs.

* * * * *

UNITED STATES PATENT AND TRADEMARK OFFICE
CERTIFICATE OF CORRECTION

PATENT NO. : 4,051,766
DATED : October 4, 1977
INVENTOR(S) : GUNTHER STRAUFF

It is certified that error appears in the above-identified patent and that said Letters Patent are hereby corrected as shown below:

```
Column 8, line 22, delete numeral "41"
Column 8, line 32, delete "with 51 and exhaust"
        and replace with --with an exhaust--
Column 5, line 9, delete "Phd 1" and replace
        with --P₁--
```

Column 5, line 9, delete "Phd 1" and replace with $--P_1--$

Signed and Sealed this

Twenty-eighth Day of February 1978

[SEAL]

Attest:

RUTH C. MASON
Attesting Officer

LUTRELLE F. PARKER
Acting Commissioner of Patents and Trademarks